(12) United States Patent
Azar

(10) Patent No.: US 11,146,139 B2
(45) Date of Patent: Oct. 12, 2021

(54) ELECTRIC GENERATOR INCLUDING A STATOR END PLATE

(71) Applicant: SIEMENS GAMESA RENEWABLE ENERGY A/S, Brande (DK)

(72) Inventor: Ziad Azar, Sheffield (GB)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/236,672

(22) Filed: Dec. 31, 2018

(65) Prior Publication Data

US 2019/0214873 A1 Jul. 11, 2019

(30) Foreign Application Priority Data

Jan. 9, 2018 (EP) ..................... 18150800

(51) Int. Cl.
*H02K 1/18* (2006.01)
*H02K 3/42* (2006.01)
(Continued)

(52) U.S. Cl.
CPC ................. *H02K 3/42* (2013.01); *F03D 9/25* (2016.05); *H02K 1/185* (2013.01); *H02K 1/187* (2013.01);
(Continued)

(58) Field of Classification Search
CPC .. H02K 3/42; H02K 3/46; H02K 3/48; H02K 1/18; H02K 1/185; H02K 1/187;
(Continued)

(56) References Cited

U.S. PATENT DOCUMENTS

| 1,901,315 A | 3/1933 | McCarty | |
|---|---|---|---|
| 2004/0195926 A1* | 10/2004 | Hiwaki | H02K 3/522 |
| | | | 310/214 |

(Continued)

FOREIGN PATENT DOCUMENTS

| CN | 202221928 U | 5/2012 |
|---|---|---|
| CN | 102545405 A | 7/2012 |

(Continued)

OTHER PUBLICATIONS

European Search Report dated Jul. 5, 2018 for Application No. 18150800.3.

(Continued)

*Primary Examiner* — Michael Andrews
(74) *Attorney, Agent, or Firm* — Schmeiser, Olsen & Watts LLP

(57) ABSTRACT

An electric generator longitudinally extends along a longitudinal axis between a drive end and an opposite non-drive end. The electric generator includes a stator having: a stator body including a stator yoke and a plurality of teeth protruding according to a radial direction orthogonal to the longitudinal axis from the stator yoke to respective tooth radial ends, each tooth extending longitudinally between the drive end and the non-drive end, a stator support for radially supporting the stator body, the stator support further providing an axial support to the stator body at the non-drive end, an end plate for axially supporting the stator body at one of the drive end or the non-drive end.

8 Claims, 3 Drawing Sheets

(51) Int. Cl.
    *H02K 21/14*     (2006.01)
    *F03D 9/25*     (2016.01)
    *H02K 7/18*     (2006.01)

(52) U.S. Cl.
    CPC ........... *H02K 7/1838* (2013.01); *H02K 21/14* (2013.01); *F05B 2220/7068* (2013.01); *H02K 2201/06* (2013.01)

(58) Field of Classification Search
    CPC .................. H02K 7/1838; H02K 21/14; F05B 2220/7068; F03D 9/25
    USPC ..... 310/216.001, 254.1, 400, 401, 402, 422, 310/426
    See application file for complete search history.

(56) References Cited

U.S. PATENT DOCUMENTS

| | | | |
|---|---|---|---|
| 2011/0140552 A1* | 6/2011 | Lokhandwalla | H02K 1/20 310/65 |
| 2011/0175480 A1* | 7/2011 | Booth | H02K 1/278 310/156.13 |
| 2011/0266808 A1 | 11/2011 | Dawson et al. | |
| 2013/0020885 A1* | 1/2013 | Hsieh | H02K 11/33 310/43 |
| 2013/0285489 A1* | 10/2013 | Lemma | H02K 9/02 310/65 |
| 2014/0284932 A1* | 9/2014 | Sharkh | H02K 7/1838 290/54 |
| 2015/0364955 A1 | 12/2015 | Aumann | |

FOREIGN PATENT DOCUMENTS

| | | |
|---|---|---|
| CN | 103378667 A | 10/2013 |
| CN | 104137399 A | 11/2014 |
| DE | 1037572 B | 8/1958 |

OTHER PUBLICATIONS

Non-English Chinese Office Action for Application No. 201910019248.5, dated Jul. 1, 2020.

* cited by examiner

ELECTRIC GENERATOR INCLUDING A STATOR END PLATE

CROSS-REFERENCE TO RELATED APPLICATION

This application claims priority to European Application No. 18150800.3, having a filing date of Jan. 9, 2018, the entire contents of which are hereby incorporated by reference.

FIELD OF TECHNOLOGY

The following relates to an electric generator including a stator end plate.

Particularly, but not exclusively, the present invention may be efficiently applied to an electric generator of a wind turbine.

BACKGROUND

An electric generator, such as an electric generator installed in a wind turbine, typically comprises a rotor which rotates relative to a stator.

The electric generator extends axially between a drive end (DE), connected to the driving device (i.e. the rotor with blades of the wind turbine) and an axially opposite non-drive end (NDE). The stator normally comprises a frame body longitudinally extending along a longitudinal axis and including a stator yoke and a plurality of teeth protruding according to a radial direction from the stator yoke to respective tooth radial ends. Each tooth extends also longitudinally between a first tooth longitudinal end and a second tooth longitudinal end. In the stator a plurality of slots are also defined, each slot being delimited circumferentially by two adjacent teeth and radially extending between the stator yoke and the respective tooth radial ends. Each slot houses a respective winding.

End plates are typically provided at the teeth longitudinal ends, both at the drive end and the non-drive end. The end plates mechanically support the stator lamination and in particular the teeth during manufacturing and operation. The end plates have a typical finger shape for following the shape of the stator teeth.

Such finger plates are normally laminated and made of mild steel and are characterized by eddy current losses leading to lower rated power and efficiency (in particular a lower AEP, Annual Energy Production).

Another inconvenience of the finger plates is that they are expensive to manufacture.

In order to reduce the inconvenience of eddy current losses, the finger plates may be made of stainless steel. However, the cost (material and manufacturing) of such option is significant high. Another option is to laminate the finger plate with a layer of glue between the laminations, which constitute them. Such technique however is not particularly efficient, permitting to achieve finger plates, which are not as strong as desired. Further, the gluing is excessively expensive to implement, needing a clear environment, a pressing mechanism and other devices.

Therefore, there is still a need to provide an improved design for a stator of an electric generator, which permits to reduce the above described inconveniences associated to the use of the finger end plates and at the same time to provide the necessary mechanical support for the teeth of the stator.

SUMMARY

An aspect relates to a stator for an electric generator. The stator comprises:

- a stator body longitudinally extending along a longitudinal axis of the stator between a drive end and an opposite non-drive end, the stator body including a stator yoke and a plurality of teeth protruding according to a radial direction orthogonal to the longitudinal axis from the stator yoke to respective tooth radial ends, each tooth extending longitudinally between the drive end and the non-drive end,
- a stator support for radially supporting the stator body, the stator support further providing an axial support to the stator body at the non-drive end, wherein the stator further comprises an end plate for axially supporting the stator body at one of the drive end or the non-drive end.

An electric generator including the above described stator may be advantageously integrated in a wind turbine.

According to embodiments of the invention, the stator support includes a shoulder at the non-drive end for axially supporting the stator body.

According to further embodiments of the invention, the end plate is finger-shaped, the end plate including a plate yoke adjacent to the stator yoke and a plurality of stator teeth protruding from the plate yoke according to the radial direction and respectively adjacent to the teeth of the stator body.

Either the stator body or the end plate may include a plurality of laminations stacked along the longitudinal axis of the stator.

It has been found out the reason of eddy-current losses in electric generators is the high saturation in the stator behind the end plate. The losses are proportional to the saturation. Saturation level may vary axially across the stator lamination, particularly in skewed generators, i.e. generators where the magnets on the rotor and/or the teeth on the stator are skewed. As a consequence, the saturation level at one of the ends, i.e. depending on the skew direction, may be significantly different than the saturation level at the other end. It has been measured that, when two end plates are being used, respectively at the drive end at the non-drive end, the losses in one end plate, i.e. at the non-drive end, may be more than the 90% of the total losses.

Advantageously, the present application proposes a single end plate design, where only an end plate at the low losses end, i.e. the drive end, is used to provide mechanical support and at the same time contributed with a reduced amount of eddy-current losses.

With respect to a traditional design, the end plate at the other end, i.e. non-drive end, can be removed and the laminations of the stator can be extended by the same thickness as the end plate. Advantageously, this further contributes in reducing the eddy-current losses caused by the presence of any finger plate.

The aspects defined above and further aspects of embodiments of the present invention are apparent from the examples of embodiment to be described hereinafter and are explained with reference to the examples of embodiment. The embodiments will be described in more detail hereinafter with reference to examples of embodiments but to which embodiments of the invention is not limited.

BRIEF DESCRIPTION

Some of the embodiments will be described in detail, with references to the following Figures, wherein like designations denote like members, wherein.

DETAILED DESCRIPTION

Figure 1:
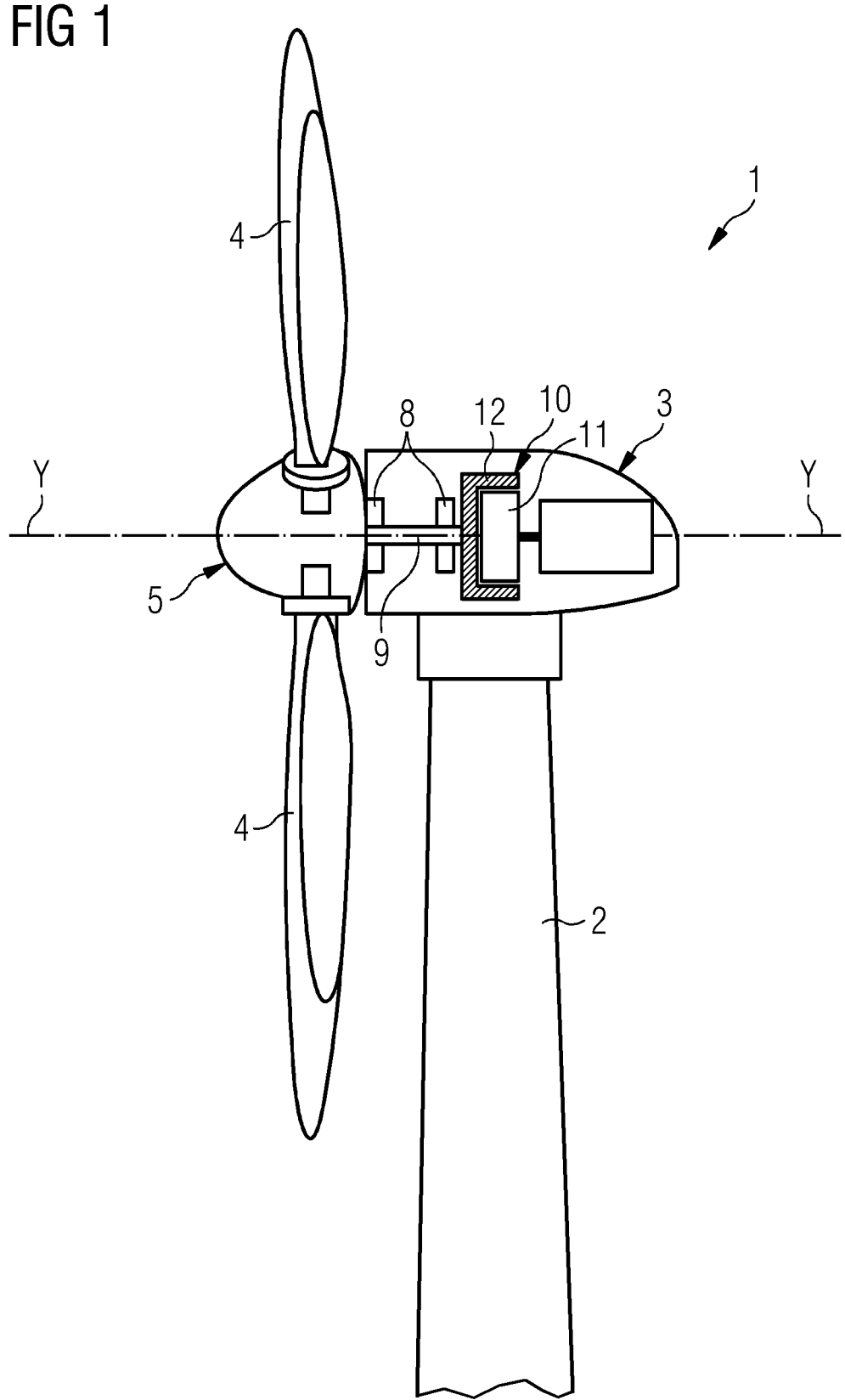
FIG. 1 shows a schematic section of a wind turbine including an electric generator.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted fundament. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y.

The wind turbine 1 comprises a permanent magnet electric generator 10.

According to other possible embodiments of the present invention (not represented in the attached figures), embodiments of the present invention may be applied to any other type of permanent magnet machine with either internal or external rotor 12.

The wind rotor 5 is rotationally coupled with the permanent magnet generator 10 either directly, e.g. direct drive or by means of a rotatable main shaft 9 and through a gear box (not shown in FIG. 1). A schematically depicted bearing assembly 8 is provided in order to hold in place the rotor 5. The rotatable main shaft 9 extends along the rotational axis Y. The permanent magnet electric generator 10 extends longitudinally between a drive end 31 connected to the wind rotor 5 and an opposite non-drive end 32.

The permanent magnet electric generator 10 includes a stator 11 and a rotor 12. The rotor 12 is rotatable with respect to the stator 11 about the rotational axis Y.

Figure 2:
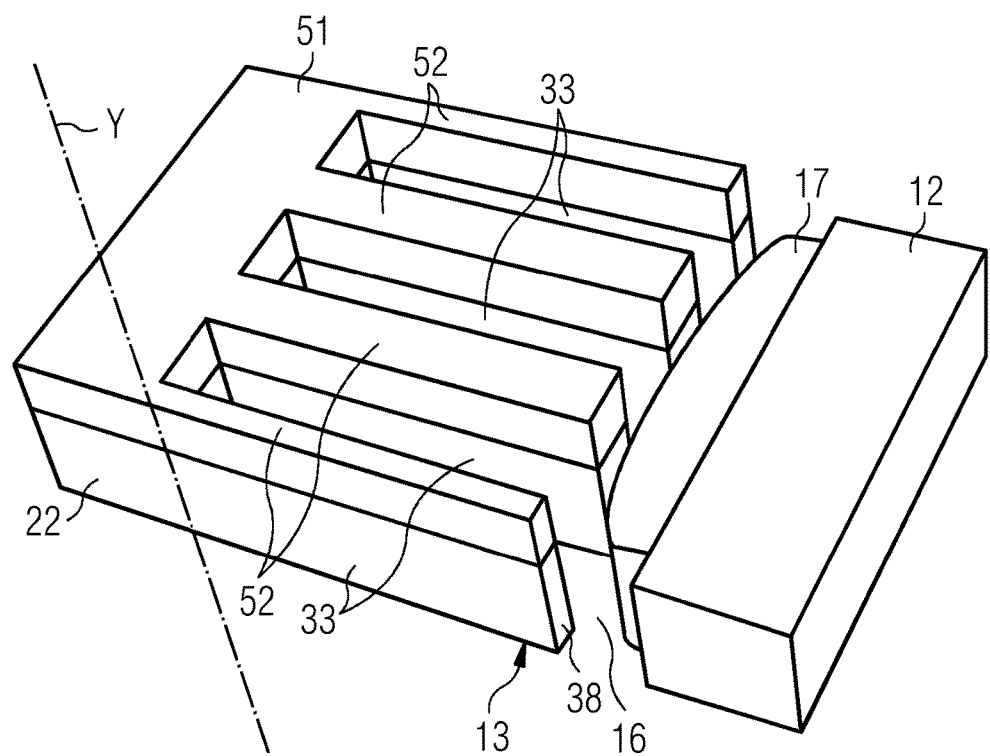
FIG. 2 shows a schematic axonometric view of the electric generator of FIG. 1.

FIG. 2 shows a more detailed view of the stator 11 and the rotor 12 of the electrical generator 10. The rotor 12 is radially external with respect the stator 11. A plurality of permanent magnets 17 (only one permanent magnet 17 is shown in FIG. 2) are attached on a face of the rotor 12 facing the stator 11.

According to possible embodiments of the present invention, the magnets 17 on the rotor 12 may be skewed with respect to the longitudinal axis Y.

An air gap 16, which extends circumferential around the axis Y, is provided between the rotor 12 and the stator 11 and in particular between the permanent magnets 17 and the stator 11.

The rotor 12 and the permanent magnets 17 are not a specific part of embodiments of the present invention and therefore not described in further detail. The following can be therefore adapted to electrical generators with or without permanent magnets.

The stator 11 comprises a stator body 13 longitudinally extending along the longitudinal axis.

The stator 11 has a conventional lamination structure including a plurality of laminations 18 stacked along the longitudinal axis Y.

The stator body 13 includes a stator yoke 22 and a plurality of teeth 33 protruding according to a radial direction orthogonal to the longitudinal axis Y from the stator yoke 22 to respective tooth radial ends 38, each tooth extending longitudinally between the drive end 31 and the non-drive end 32.

According to possible embodiments of the present invention, the teeth 33 may be skewed with respect to the longitudinal axis Y.

Figure 3:
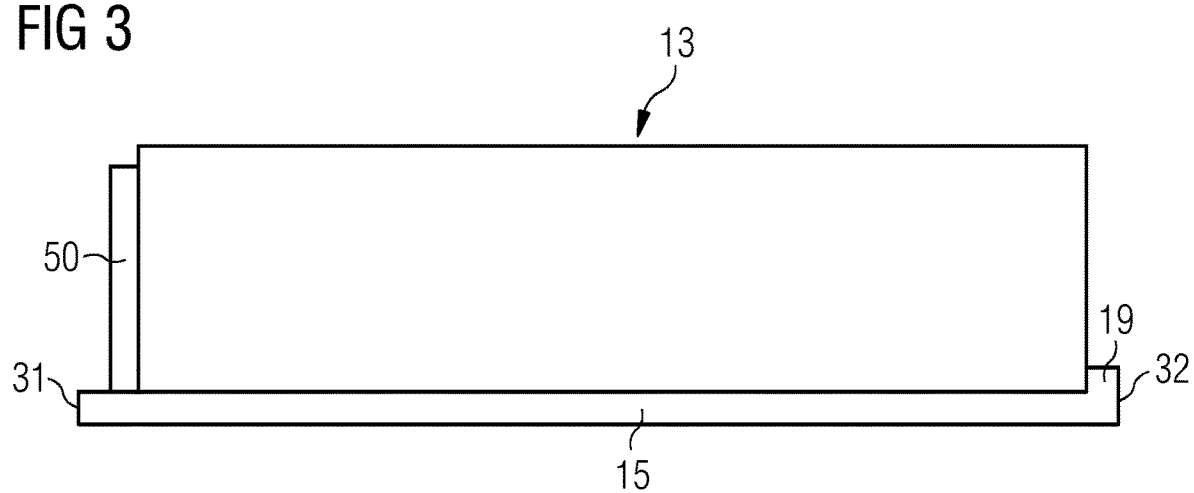
FIG. 3 shows a schematic longitudinal section of the stator of the electric generator of FIG. 2.

With reference to FIG. 3, the stator 11 further comprises a stator support 15 for radially supporting the stator body 13. The stator support 15 further provides an axial support to the stator body 13 at the non-drive end 32.

A shoulder 19 extending circumferentially and protruding radially from the stator support 15 is provided at the non-drive end 32 for axially supporting the plurality of laminations 18 of the stator body 13.

With reference to FIGS. 2 and 3, the stator 10 further comprises an end plate 50 for axially supporting the plurality of laminations 18 of the stator body 11 at the drive end 31.

In the embodiment of the attached figures, the end plate 50 is finger-shaped, the end plate 50 including a plate yoke 51 adjacent to the stator yoke 12 and a plurality of plate teeth 52 protruding from the plate yoke 22 according to the radial direction. Each plate tooth 52 of the end plate 50 is adjacent to a respective tooth 33 of the stator body 13, for providing an efficient support. According to possible embodiments of the present invention, similarly to the stator body 13, the end plate 50 includes a plurality of plate laminations stacked along the longitudinal axis Y of the stator 10.

According to another embodiment of the present invention (not shown), the stator 10 comprises an end plate for axially supporting the plurality of laminations 18 of the stator body 11 at the non-drive end 32, while at the drive end 31 an axial support, for example in the form of a shoulder may be used. According to embodiments of the present invention, the end plate is to be used only at the longitudinal end where the losses are lower. At such end the end plate is used to provide mechanical support and at the same time contributed with a reduced amount of eddy-current losses.

Figure 4:
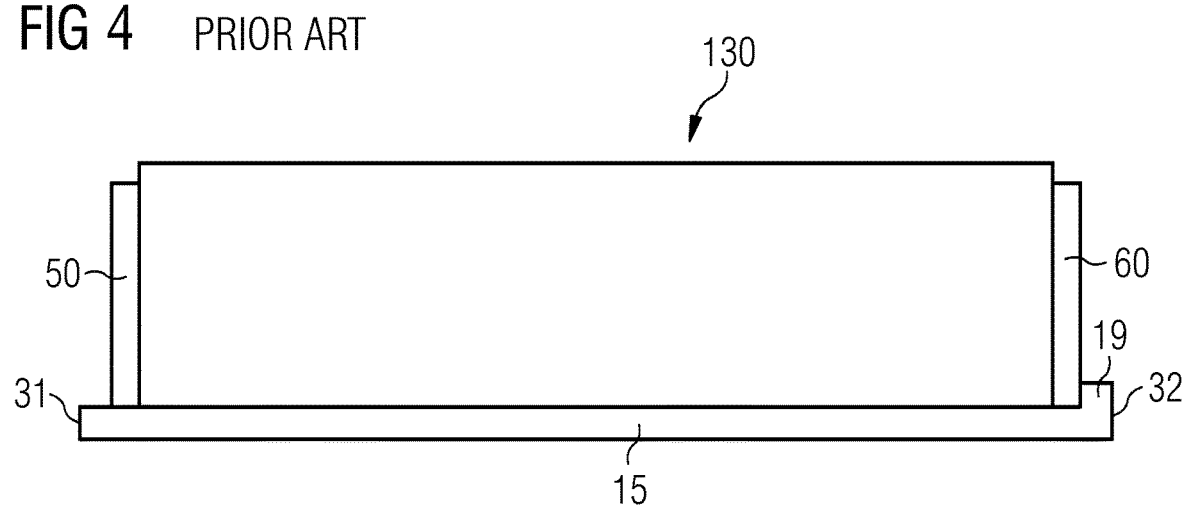
FIG. 4 shows a schematic longitudinal section, corresponding to the section of FIG. 3, of a stator for an electric generator.
Figure 5:
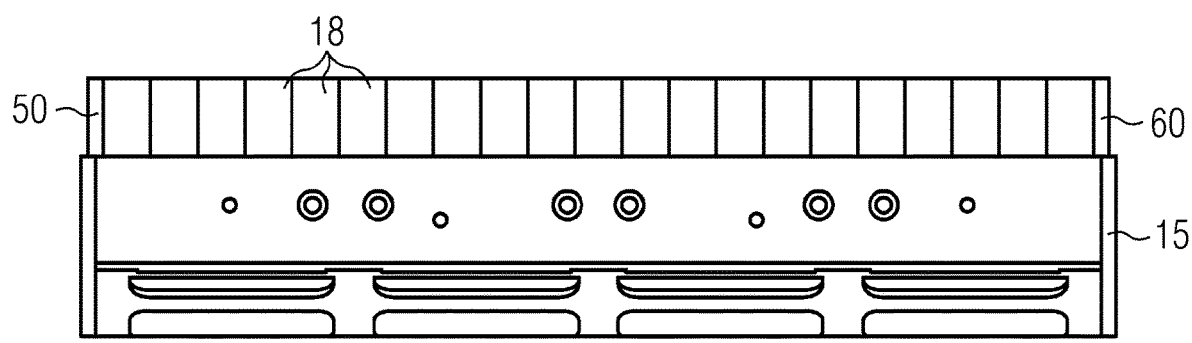
FIG. 5 shows another and more detailed longitudinal section of a stator for an electric generator.

FIGS. 4 and 5 show a stator 130 according to the known art. The stator 130 includes the same stator support 15 and an end plate 50 at the drive end 31. The stator 130 further includes another end plate 60 at the non-drive end 32. The second end plate 60 is axially interposed between the plurality of laminations 18 of the stator body 13 and the shoulder 19. Consequently, the stack of laminations 18 of the stator body 13 is axially shorter than the stack of the stator 13 of embodiments of the present invention.

As a result, in addition to significantly reducing the eddy current loss in finger plates without losing the mechanical strength of the segment, embodiments of the present invention further permits:

a better utilization of copper as the non-drive plate can replaced by stator laminations, which contribute to the torque produced by the electric generator, higher torque and rated power and larger AEP, lower manufacturing cost due to a lower number of components, the possibility to use the same stator support used in known implementations.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An electric generator longitudinally extending along a longitudinal axis between a drive end and an opposite non-drive end, the electric generator comprising a stator having:
   a stator body including a stator yoke and a plurality of teeth protruding according to a radial direction orthogonal to the longitudinal axis from the stator yoke to respective tooth radial ends, each tooth extending longitudinally between the drive end and the non-drive end, and
   a stator support located radially inward of the stator body for radially supporting the stator body, the stator support further providing an axial support to the stator body at the non-drive end, wherein the axial support is provided by a shoulder extending longitudinally past a non-drive end of the stator body, protruding radially outward from the stator support, and extending around a circumferential distance of the stator support,
wherein the stator further comprises an end plate for axially supporting the stator body at the drive end, wherein the end plate is finger-shaped, wherein the end plate includes a plate yoke adjacent to the stator yoke and a plurality of plate teeth protruding from the plate yoke according to the radial direction, and wherein each plate tooth of the plurality of plate teeth is adjacent to a respective stator tooth of the plurality of teeth of the stator body.

2. The electric generator as claimed in claim 1, wherein the stator body includes a plurality of laminations stacked along the longitudinal axis of the stator.

3. The electric generator as claimed in claim 1, wherein the end plate includes a plurality of plate laminations stacked along the longitudinal axis of the stator.

4. The electric generator as claimed in claim 1, the electric generator further including a rotor having a plurality of magnets, wherein the teeth on the stator body and/or the magnets on the rotor are skewed with respect to the longitudinal axis.

5. A wind turbine including a wind rotor and the electric generator according to claim 1, the wind rotor being connected to the drive end of the electric generator.

6. A stator for an electric generator comprising:
   a stator body including a stator yoke and a plurality of teeth protruding according to a radial direction orthogonal to the longitudinal axis from the stator yoke to respective tooth radial ends, each tooth extending longitudinally between a first end and a second opposite end, and
   a stator support located radially inward of the stator body for radially supporting the stator body, the stator support further providing an axial support to the stator body at one of the first end and the second opposite end, wherein the axial support is a shoulder extending longitudinally past the respective one of the first end and the second opposite end, protruding radially outward from the stator support, and extending around a circumferential distance of the stator support,
wherein the stator further comprises an end plate for axially supporting the stator body at the other of the first end and the second opposite end, wherein the end plate is finger-shaped, wherein the end plate includes a plate yoke adjacent to the stator yoke and a plurality of plate teeth protruding from the plate yoke according to the radial direction, and wherein each plate tooth of the plurality of plate teeth is adjacent to a respective stator tooth of the plurality of teeth of the stator body.

7. The stator of claim 6, wherein one of the first end and the second opposite end is a drive end and wherein the end plate is provided where eddy-current losses are lower.

8. The stator of claim 6, wherein one of the first end and the second opposite end is a non-drive end and wherein the shoulder is located at the non-drive end.

* * * * *